(12) United States Patent
Inoshita (10) Patent No.: US 12,537,910 B2
(45) Date of Patent: *Jan. 27, 2026

(54) FLYING BODY CONTROL APPARATUS, FLYING BODY CONTROL METHOD, AND FLYING BODY CONTROL PROGRAM

(71) Applicant: NEC CORPORATION, Tokyo (JP)

(72) Inventor: Tetsuo Inoshita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/234,235

(22) Filed: Aug. 15, 2023

(65) Prior Publication Data

US 2023/0388449 A1 Nov. 30, 2023

Related U.S. Application Data

(63) Continuation of application No. 16/637,393, filed as application No. PCT/JP2017/028755 on Aug. 8, 2017, now Pat. No. 11,765,315.

(51) Int. Cl.
*H04N 5/77* (2006.01)
*B64D 45/08* (2006.01)
(Continued)

(52) U.S. Cl.
CPC .............. *H04N 5/772* (2013.01); *B64D 45/08* (2013.01); *B64U 70/00* (2023.01); *G05D 1/0808* (2013.01); *G05D 1/101* (2013.01); *G06T 7/20* (2013.01); *G06V 10/462* (2022.01); *G06V 20/17* (2022.01); *G08G 5/54* (2025.01); *H04N 5/765* (2013.01);
(Continued)

(58) Field of Classification Search
None
See application file for complete search history.

(56) References Cited

U.S. PATENT DOCUMENTS 8,880,328 B2  11/2014  Ovens
9,671,791 B1*  6/2017  Paczan ................. G05D 1/0088
(Continued)

FOREIGN PATENT DOCUMENTS

EP  2423871 A1  2/2012
JP  2000-085694 A  3/2000
(Continued)

OTHER PUBLICATIONS

Japanese Office Action for JP Application No. 2020-185182 mailed on Sep. 7, 2021 with English Translation.
(Continued)

*Primary Examiner* — Hung Q Dang
(74) *Attorney, Agent, or Firm* — Sughrue Mion, PLLC (57) ABSTRACT

To more reliably land a flying body at a desired point, a flying body includes a determiner that determines whether the flying body is taking off and ascending from a takeoff point or descending to land, a camera mounted in the flying body, a recorder that records a lower image captured by the camera if it is determined that the flying body is taking off and ascending and a guider that, if it is determined that the flying body is descending to land, guides the flying body to the takeoff point while descending using a lower image recorded in the recorder during takeoff/ascent and a lower image captured during the descent.

6 Claims, 13 Drawing Sheets

(51) Int. Cl.
  *B64U 70/00* (2023.01)
  *B64U 80/86* (2023.01)
  *G05D 1/00* (2024.01)
  *G06T 7/20* (2017.01)
  *G06V 10/46* (2022.01)
  *G06V 20/17* (2022.01)
  *G08G 5/21* (2025.01)
  *G08G 5/54* (2025.01)
  *G08G 5/55* (2025.01)
  *G08G 5/74* (2025.01)
  *H04N 5/765* (2006.01)
  *H04N 5/91* (2006.01)

(52) U.S. Cl.
  CPC ......... *H04N 5/91* (2013.01); *B64U 2201/104* (2023.01); *G06T 2207/10032* (2013.01); *G06T 2207/30181* (2013.01)

(56) References Cited

U.S. PATENT DOCUMENTS

| | | |
|---|---|---|
| 2006/0177103 A1 | 8/2006 | Hildreth |
| 2012/0078451 A1 | 3/2012 | Ohtomo et al. |
| 2012/0277934 A1 | 11/2012 | Ohtomo et al. |
| 2014/0114888 A1* | 4/2014 | Noda ................ G06N 20/00 706/12 |
| 2016/0309124 A1* | 10/2016 | Yang ................ G05D 1/0094 |
| 2017/0017240 A1 | 1/2017 | Sharma et al. |
| 2017/0090271 A1 | 3/2017 | Harris |
| 2017/0129603 A1* | 5/2017 | Raptopoulos ........ B64F 1/22 |
| 2017/0308100 A1* | 10/2017 | Iskrev ............... G05D 1/0676 |
| 2017/0351900 A1 | 12/2017 | Lee |
| 2018/0292201 A1 | 10/2018 | Sakano |
| 2018/0357910 A1 | 12/2018 | Hobbs |
| 2019/0220039 A1 | 7/2019 | Wu |

FOREIGN PATENT DOCUMENTS

| | | |
|---|---|---|
| JP | 2011-182341 A | 9/2011 |
| JP | 2012-071645 A | 4/2012 |
| JP | 2012-232654 A | 11/2012 |
| WO | 2019/030820 A1 | 2/2019 |

OTHER PUBLICATIONS

Non-Final Office Action issued in U.S. Appl. No. 16/637,393 dated Mar. 17, 2022.
Final Office Action issued in U.S. Appl. No. 16/637,393 dated Aug. 8, 2022.
Non-Final Office Action issued in U.S. Appl. No. 16/637,393 dated Oct. 24, 2022.
Final Office Action issued in U.S. Appl. No. 16/637,393 dated Mar. 3, 2023.
Notice of Allowance issued in U.S. Appl. No. 16/637,393 dated May 24, 2023.
International Search Report for PCT/JP2017/028755 dated Oct. 10, 2017 (PCT/ISA/210).

* cited by examiner

FLYING BODY CONTROL APPARATUS, FLYING BODY CONTROL METHOD, AND FLYING BODY CONTROL PROGRAM

CROSS REFERENCE TO RELATED APPLICATION

This application is a continuation of U.S. application Ser. No. 16/637,393, filed Feb. 7, 2020, which is a National Stage of International Application No. PCT/JP2017/028755 filed Aug. 8, 2017, the entire contents of all of which are incorporated herein by reference

TECHNICAL FIELD

The present invention relates to a flying body, a flying body control apparatus, a flying body control method, and a flying body control program.

BACKGROUND ART

In the above technical field, patent literature 1 discloses a technique of performing automatic guidance control of a flying body to a target mark placed on the ground at the time of landing to save the technique and labor of a pilot.

CITATION LIST

Patent Literature

Patent literature 1: Japanese Patent Laid-Open No. 2012-71645

SUMMARY OF THE INVENTION

Technical Problem

In the technique described in the literature, however, depending on the flight altitude, it may be impossible to accurately visually recognize the target mark, and the flying body may be unable to land at a desired point.

The present invention provides a technique of solving the above-described problem.

Solution to Problem

One example aspect of the present invention provides a flying body comprising:
  a determiner that determines whether the flying body is taking off and ascending from a takeoff point or descending to land;
  a camera attached to the flying body;
  a recorder that records a lower image captured by the camera if it is determined that the flying body is taking off and ascending; and
  a guider that, if it is determined that the flying body is descending to land, guides the flying body to the takeoff point while descending using a lower image recorded in the recorder during takeoff/ascent and a lower image captured during the descent.

Another example aspect of the present invention provides a flying body control apparatus comprising:
  a determiner that determines whether a flying body is taking off and ascending from a takeoff point or descending to land;
  a recorder that causes a camera to capture a lower image and records the captured lower image if it is determined that the flying body is taking off and ascending; and
  a guider that, if it is determined that the flying body is descending to land, guides the flying body to the takeoff point while descending using a lower image recorded in the recorder during takeoff/ascent and a lower image captured during the descent.

Still other example aspect of the present invention provides a control method of a flying body, comprising:
  determining whether the flying body is taking off and ascending from a takeoff point or descending to land;
  causing a camera to capture a lower image and recording the captured lower image if it is determined that the flying body is taking off and ascending; and
  if it is determined that the flying body is descending to land, guiding the flying body to the takeoff point while descending using a lower image recorded during takeoff/ascent and a lower image captured during the descent.

Still other example aspect of the present invention provides a flying body control program for causing a computer to execute a method, comprising:
  determining whether the flying body is taking off and ascending from a takeoff point or descending to land;
  causing a camera to capture a lower image and recording the captured lower image if it is determined that the flying body is taking off and ascending; and
  if it is determined that the flying body is descending to land, guiding the flying body to the takeoff point while descending using a lower image recorded during takeoff/ascent and a lower image captured during the descent.

ADVANTAGEOUS EFFECTS OF INVENTION

According to the present invention, it is possible to more reliably make a flying body land at a desired point.

DESCRIPTION OF EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

First Example Embodiment

Figure 1:
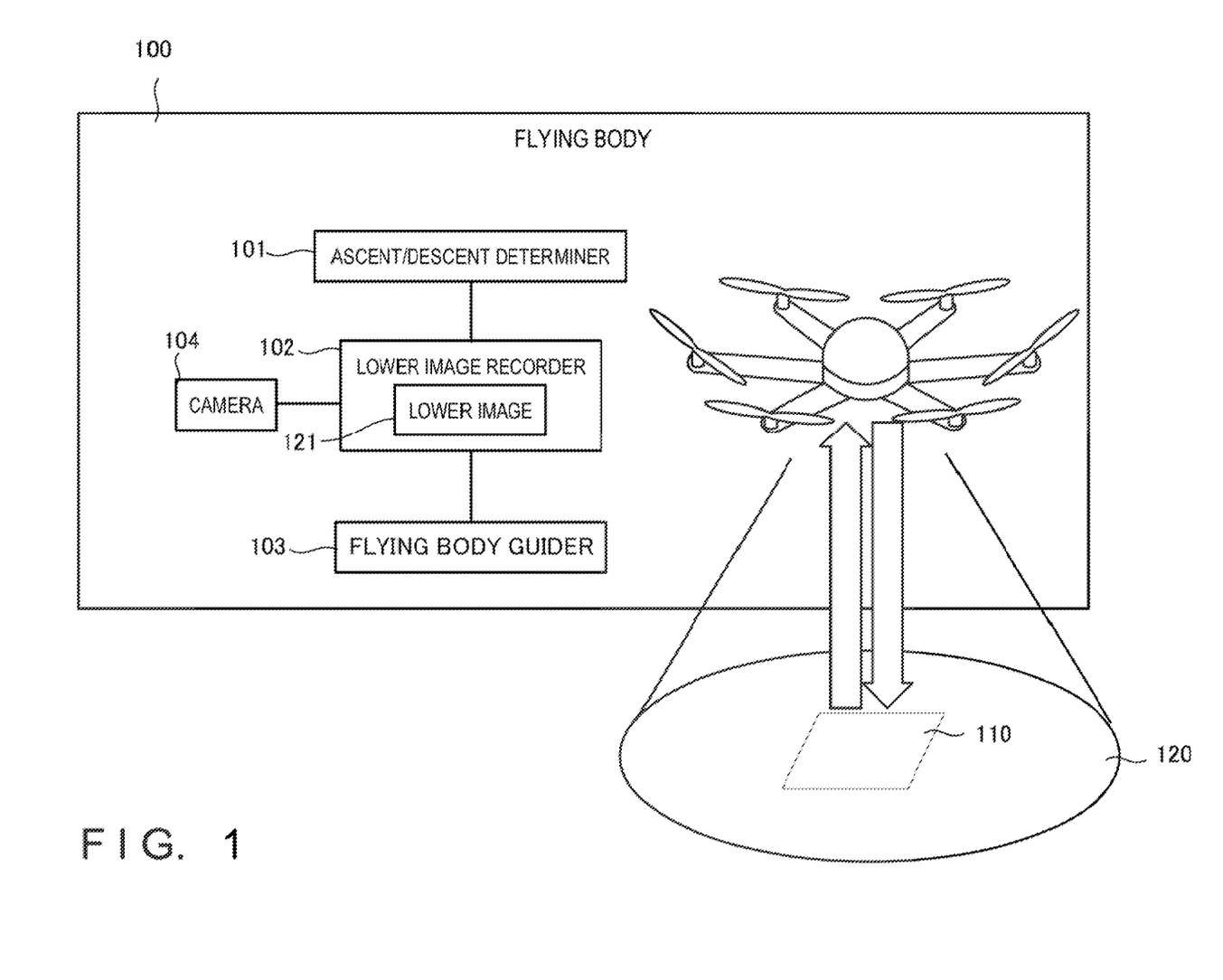
FIG. 1 is a block diagram showing the arrangement of a flying body according to the first example embodiment of the present invention.

A flying body 100 as the first example embodiment of the present invention will be described with reference to FIG. 1. As shown in FIG. 1, the flying body 100 includes an ascent/descent determiner 101, a lower image recorder 102, a flying body guider 103, and a camera 104.

The ascent/descent determiner 101 determines whether the flying body 100 is taking off and ascending from a takeoff point 110 or descending to land.

The camera 104 is attached to the flying body 100 and captures the periphery of the flying body. If it is determined that the flying body 100 is taking off and ascending, the lower image recorder 102 causes the camera 104 to capture a region 120 under the flying body that is taking off and ascending, and records a captured lower image 121.

If it is determined that the flying body 100 is descending to land, the flying body 100 is guided to the takeoff point using lower images recorded by the lower image recorder 102 during takeoff/ascent and lower images captured during descent.

According to the above-described arrangement, it is possible to more reliably make the flying body land at a desired point using lower images captured during takeoff/ascent.

Second Example Embodiment

Figure 2A:
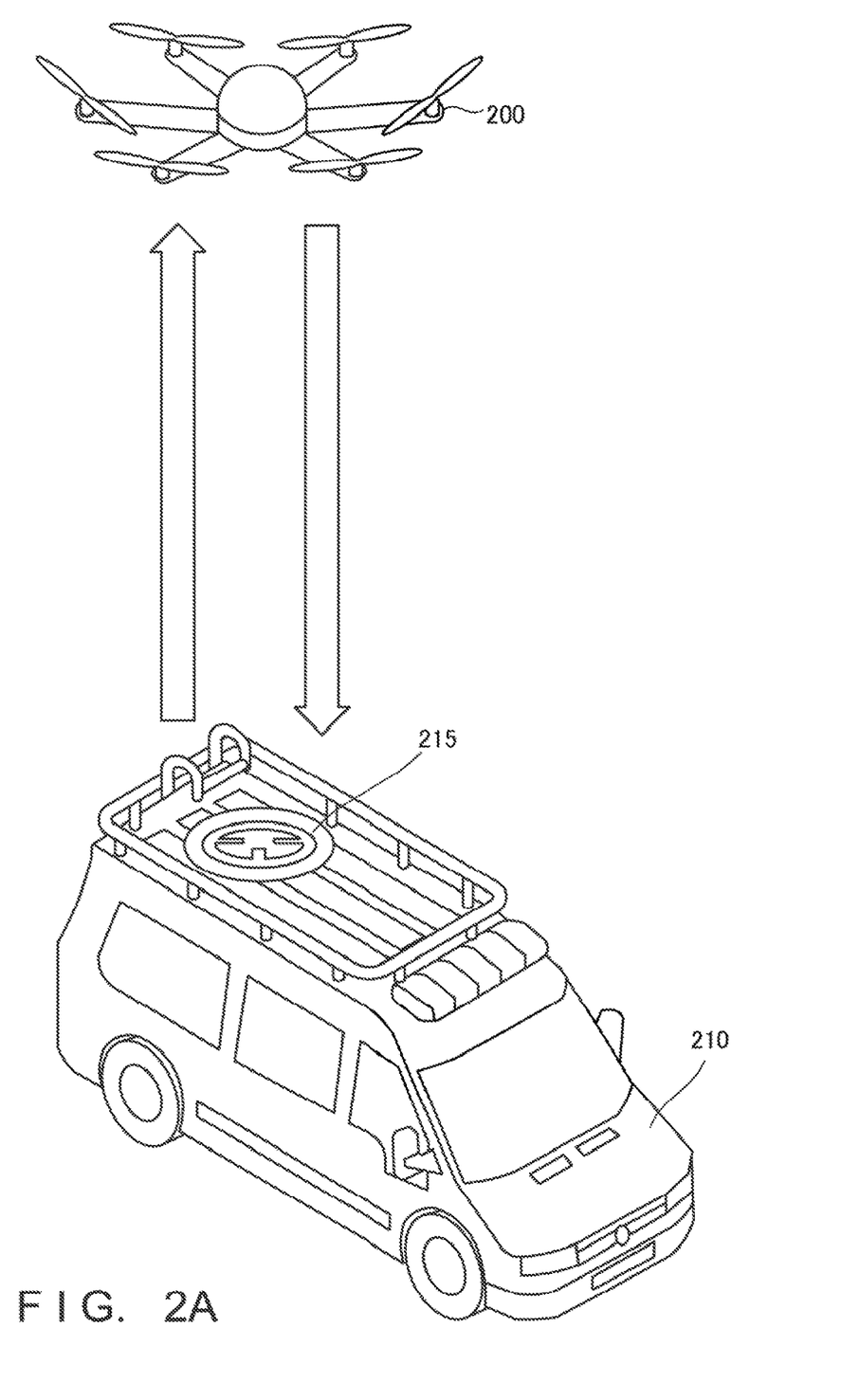
FIG. 2A is a view for explaining the flight conditions of a flying body according to the second example embodiment of the present invention.

A flying body according to the second example embodiment of the present invention will be described next with reference to FIGS. 2A to 5. FIG. 2A is a view for explaining the takeoff/landing state of a flying body 200 according to this example embodiment. To dispatch the flying body 200 to a disaster area, for example, a vehicle 210 is stopped between buildings, and the flying body 200 is caused to take off/land from/to a target mark provided on the roof of the vehicle.

Figure 2B:
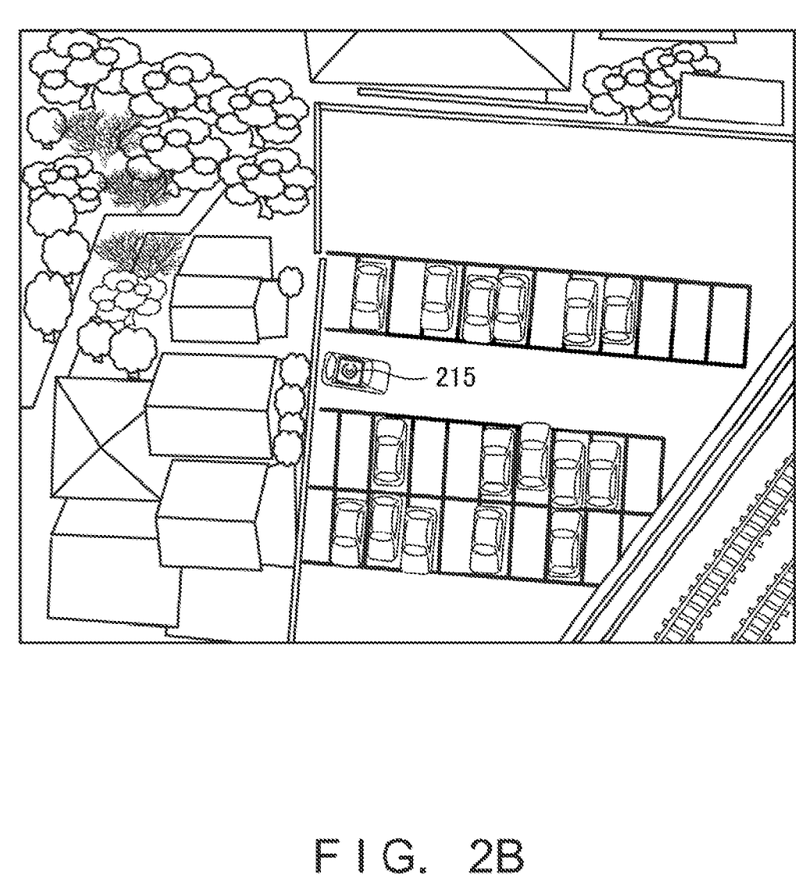
FIG. 2B is a view for explaining the flight conditions of the flying body according to the second example embodiment of the present invention.

At the time of landing, a deviation of several m occurs in control relying on a GPS (Global Positioning System), and it is therefore difficult to make the flying body land on the target mark. Furthermore, as shown in FIG. 2B, from a high altitude (for example, 100 m or more), a target mark 215 cannot be seen well, or a recognition error of the target mark 215 may occur because the target mark is disturbed by patterns or shapes observed on buildings on the periphery.

This example embodiment provides a technique for guiding the flying body 200 to a desired landing point (for example, on the roof of a vehicle or on a boat on the sea) without resort to the target mark.

Figure 3:
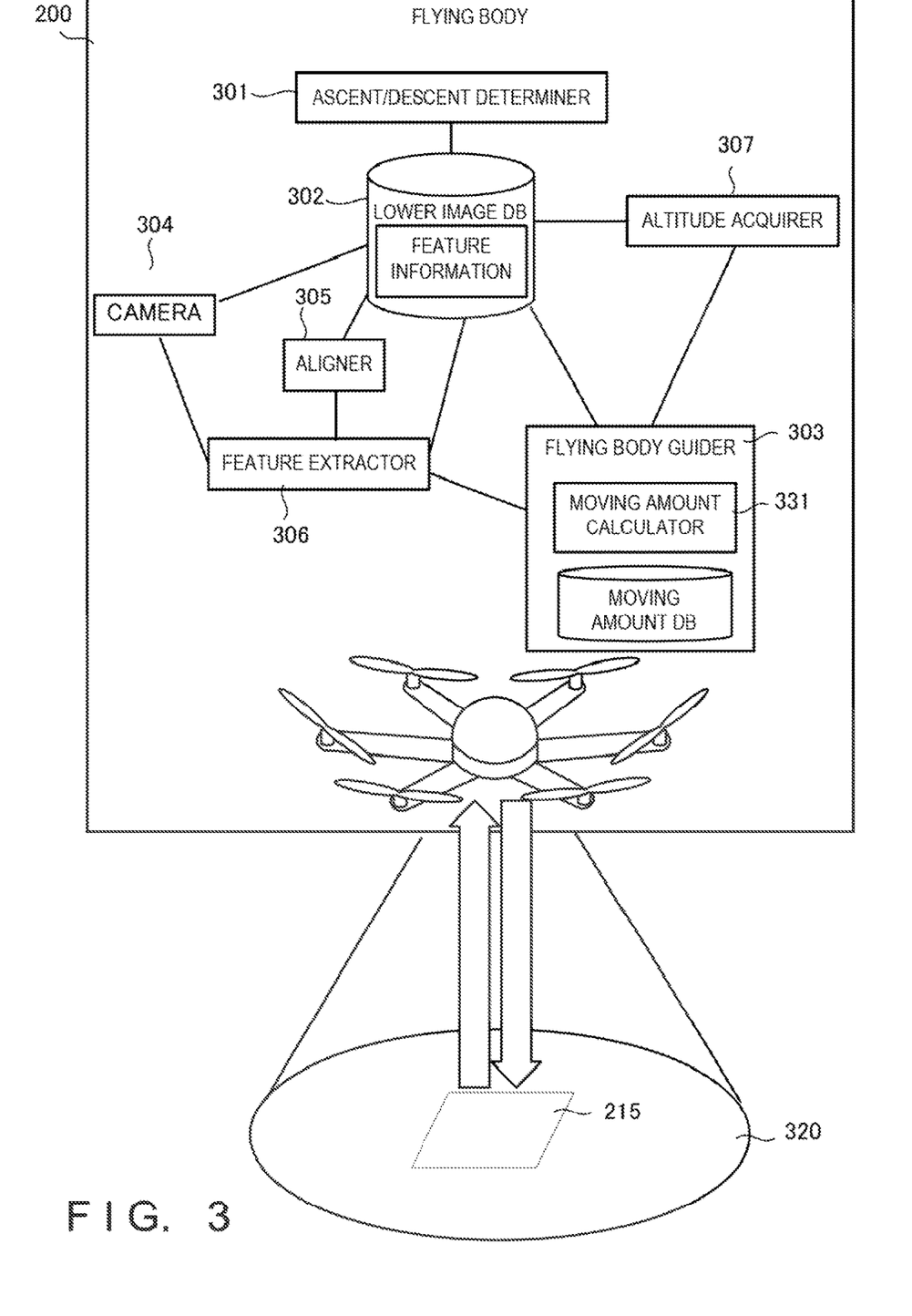
FIG. 3 is a view for explaining the arrangement of the flying body according to the second example embodiment of the present invention.

FIG. 3 is a view showing the internal arrangement of the flying body 200. The flying body 200 includes an ascent/descent determiner 301, a lower image database 302, a flying body guider 303, a camera 304, an aligner 305, a feature extractor 306, and an altitude acquirer 307.

The ascent/descent determiner 301 determines whether the flying body 200 is taking off and ascending from a takeoff point 315 or descending to land.

Figure 4:
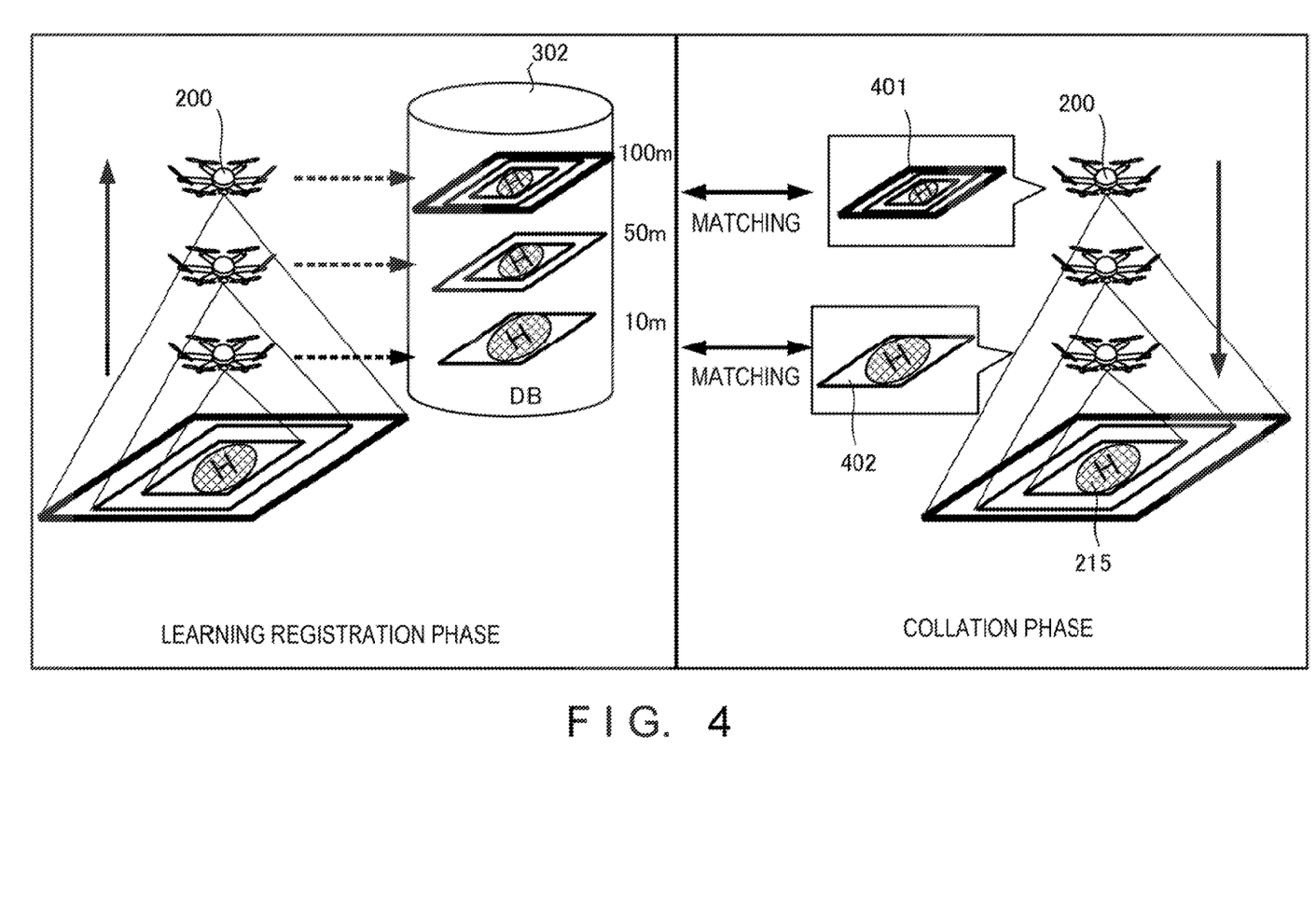
FIG. 4 is a view for explaining the arrangement of the flying body according to the second example embodiment of the present invention.

As shown in FIG. 4, if it is determined that the flying body 200 is taking off and ascending, the lower image database 302 shifts to a learning registration phase, causes the camera to capture a lower image at a predetermined altitude, and records the captured lower image. In addition, if it is determined that the flying body 200 is descending to land, the flying body guider 303 shifts to a collation phase, performs matching between the contents recorded in the lower image database 302 and lower images 401 and 402 captured during descent, and guides the flying body to the takeoff point 315 while descending.

At the time of takeoff/ascent, the camera 304 faces directly downward and captures/learns images. At the time of horizonal movement after that, the camera 304 captures images in arbitrary directions. At the time of landing, the flying body 200 is returned to the neighborhood by a GPS. At the time of landing, the flying body descends while directing the camera 304 downward to capture images.

Figure 5:
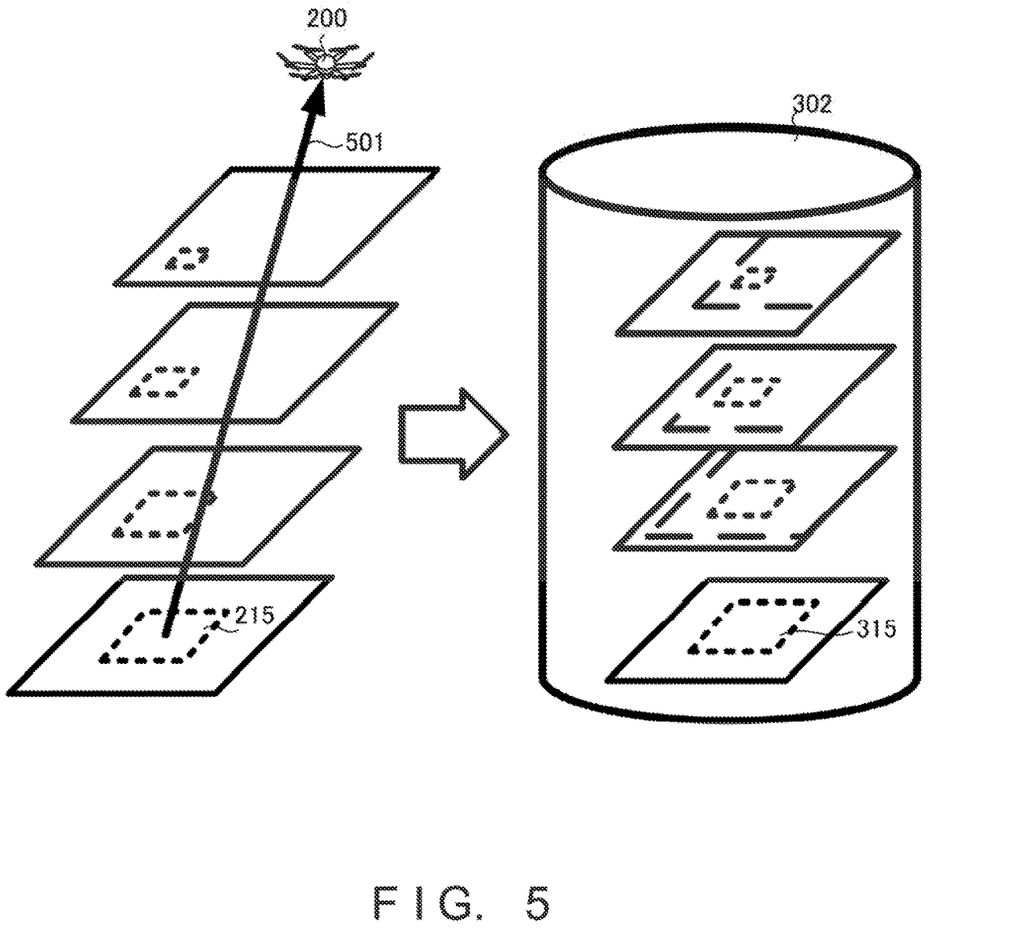
FIG. 5 is a view for explaining the arrangement of the flying body according to the second example embodiment of the present invention.

As shown in FIG. 5, the aligner 305 performs alignment of lower images to absorb a position deviation 501 of the flying body 200 during takeoff/ascent, and then records the images in the lower image database 302. That is, the lower images are cut such that the takeoff point 315 is always located at the center.

The altitude acquirer 307 acquires flight altitude information concerning the altitude at which the flying body 200 is flying. The lower image database 302 records the flight altitude information in association with a lower image. In addition, the lower image database 302 records a plurality of lower images corresponding to different image capturing altitudes.

The feature extractor 306 extracts a plurality of feature points from a lower image, and records the extracted feature points as learning information in the lower image database 302. A technique of extracting a feature point from an image for matching is disclosed in ORB: an efficient alternative to SIFT or SURF (Ethan Rublee Vincent Rabaud Kurt Konolige Gary Bradski).

Figure 6:
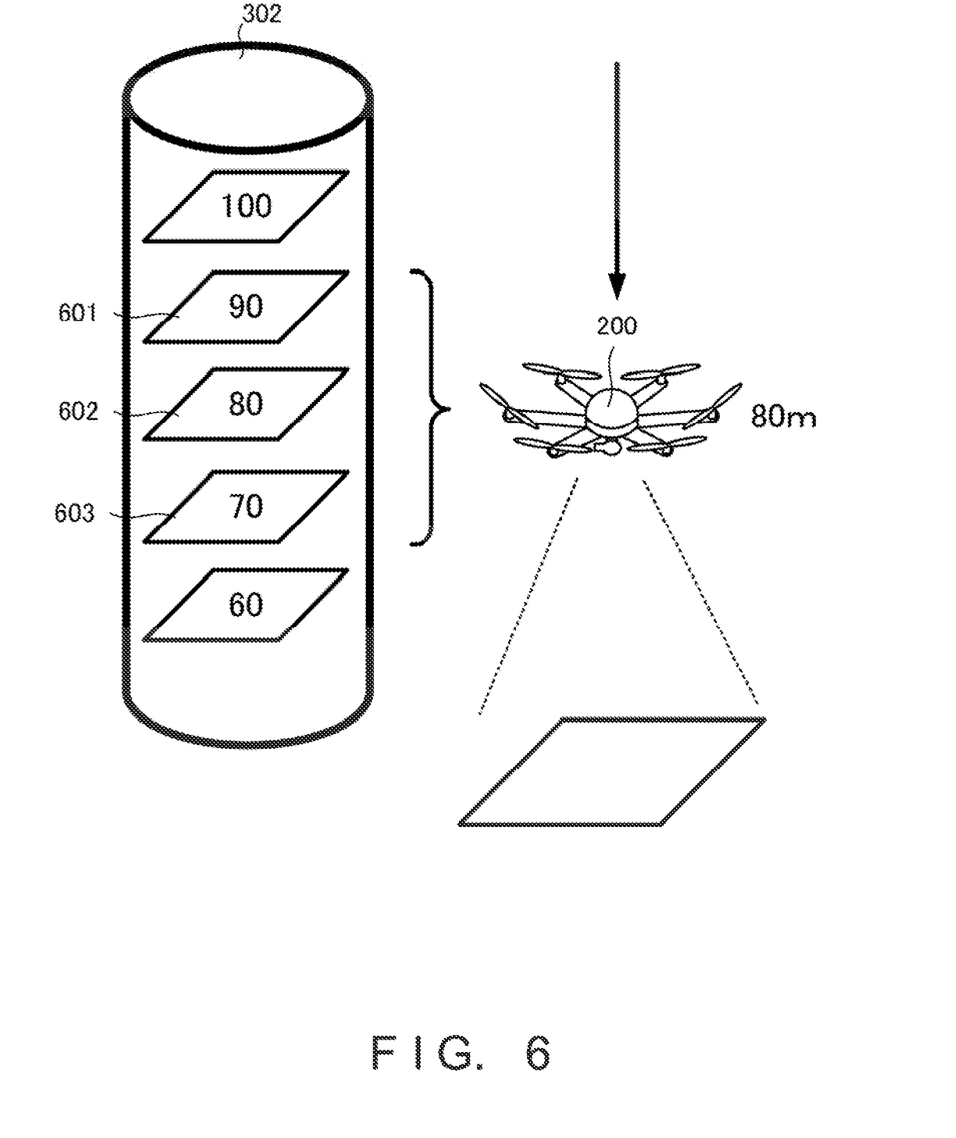
FIG. 6 is a view for explaining the arrangement of the flying body according to the second example embodiment of the present invention.

The flying body guider 303 compares feature points recorded in the lower image database 302 with feature points extracted from lower images captured during descent. In accordance with flight altitude information, the flying body guider 303 selects, from the lower image database 302, contents for which matching with lower images captured during descent should be performed. More specifically, as shown in FIG. 6, as images to be compared with images captured at the position of an altitude of 80 m during descent of the flying body 200, (the feature points of) three lower images 601 to 603 recorded in the lower image database 302 in correspondence with altitudes of 90 m, 80 m, and 70 m are selected.

At this time, if the altitude can be acquired from the altitude acquirer 307, the flying body guider 303 selects a feature point using the altitude as reference information. If the altitude cannot be acquired, the comparison target is changed from a lower image of a late acquisition timing to a lower image of an early acquisition timing.

Figure 7:
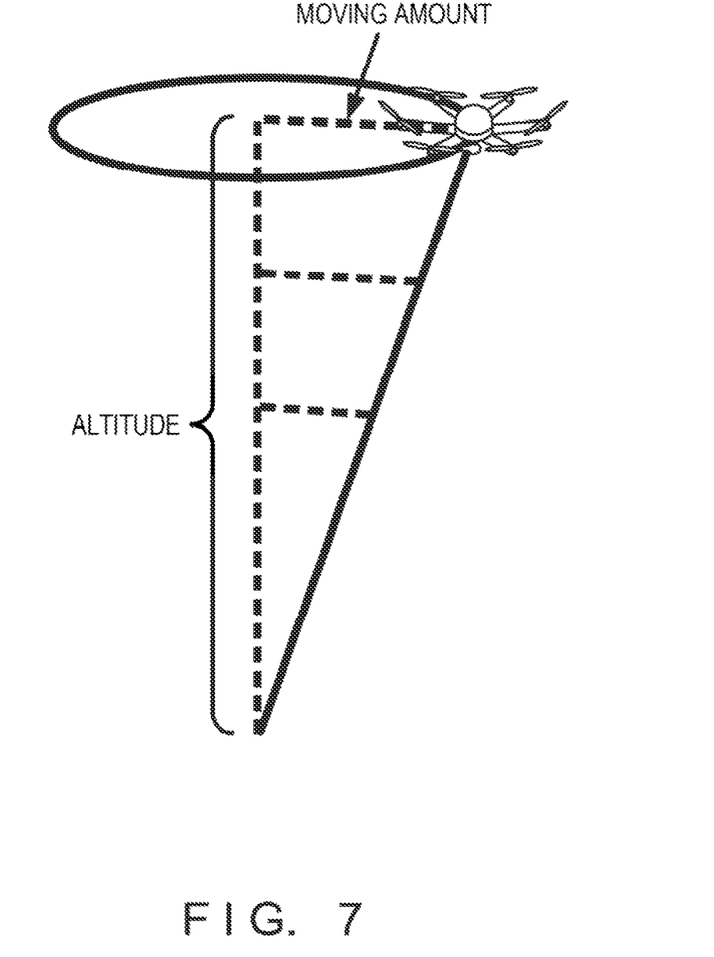
FIG. 7 is a view for explaining the arrangement of the flying body according to the second example embodiment of the present invention.

The flying body guider 303 performs matching for every predetermined altitude and performs guidance in a moving amount according to the altitude any time. More specifically, a moving amount calculator 331 refers to a moving amount database 332, and derives the moving amount of the flying body 200 based the deviation between a feature point recorded in the lower image database 302 and a feature point extracted from a lower image captured during descent. As shown in FIG. 7, even if the number of pixels corresponding to the deviation of the same feature point does not change, the flying body needs to be moved large as the altitude becomes high. Note that an invisible geofence may virtually be set by the GPS at a position corresponding to a radius of about 5 m with respect to the landing point, and control may be performed to perform a descent at a point to hit the geofence.

Figure 8:
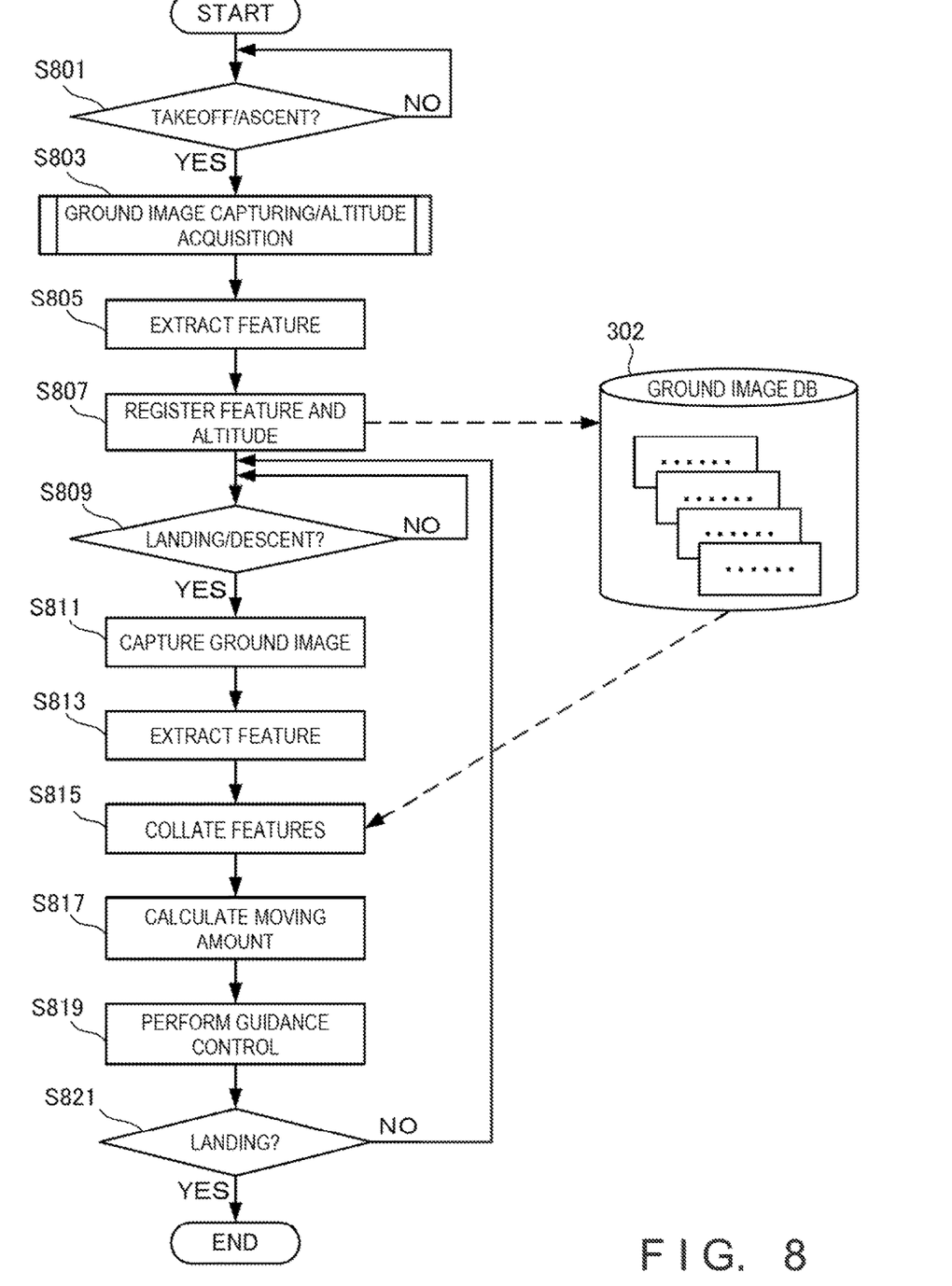
FIG. 8 is a flowchart for explaining the procedure of processing of the flying body according to the second example embodiment of the present invention.

FIG. 8 is a flowchart showing the procedure of processing performed in the flying body 200 according to this example embodiment. First, in step S801, the ascent/descent determiner 301 determines whether the flying body is taking off and ascending. Next, the process advances to step S803, the camera 304 captures an image in the ground direction, and at the same time, the altitude acquirer 307 acquires the altitude.

In step S805, while the lower image database 302 records the captured lower image, the feature extractor 306 extracts a feature point from the lower image. The process advances to step S807, and the feature point position is further recorded in the lower image database 302 in correspondence with the altitude information. At this time, the aligner 305 performs the above-described alignment processing.

Next, in step S809, the ascent/descent determiner 301 determines whether the landing/descent of the flying body 200 is detected. If the landing descent is detected, the process advances to step S811 to capture a lower image (for example, a ground image or a sea image) and record it in the lower image database 302. In step S813, the feature extractor 306 extracts a feature point from the ground image recorded in the ground image database 302. After that, in step S815, the feature extractor 306 compares the feature point with the feature point registered at the time of takeoff/ascent.

In step S817, the moving amount calculator 331 calculates the moving amount of the flying body 200 from the position deviation amount (the number of pixels) of the feature point. The process advances to step S819, and the flying body guider 303 moves the flying body 200 in accordance with the calculated moving amount.

Finally, it is determined whether landing S821 is completed. If the landing is not completed, the process returns to step S809 to repeat the processing.

As described above, according to this example embodiment, it is possible to accurately perform takeoff/landing even in a place, for example, between buildings, where it is difficult to use the GPS. In this example embodiment, feature points are extracted from lower images, and the position deviation in ascent and descent is detected by comparing the feature points. However, the present invention is not limited to this, and the position deviation in ascent and descent may be detected by comparing the lower images.

Third Example Embodiment

Figure 9:
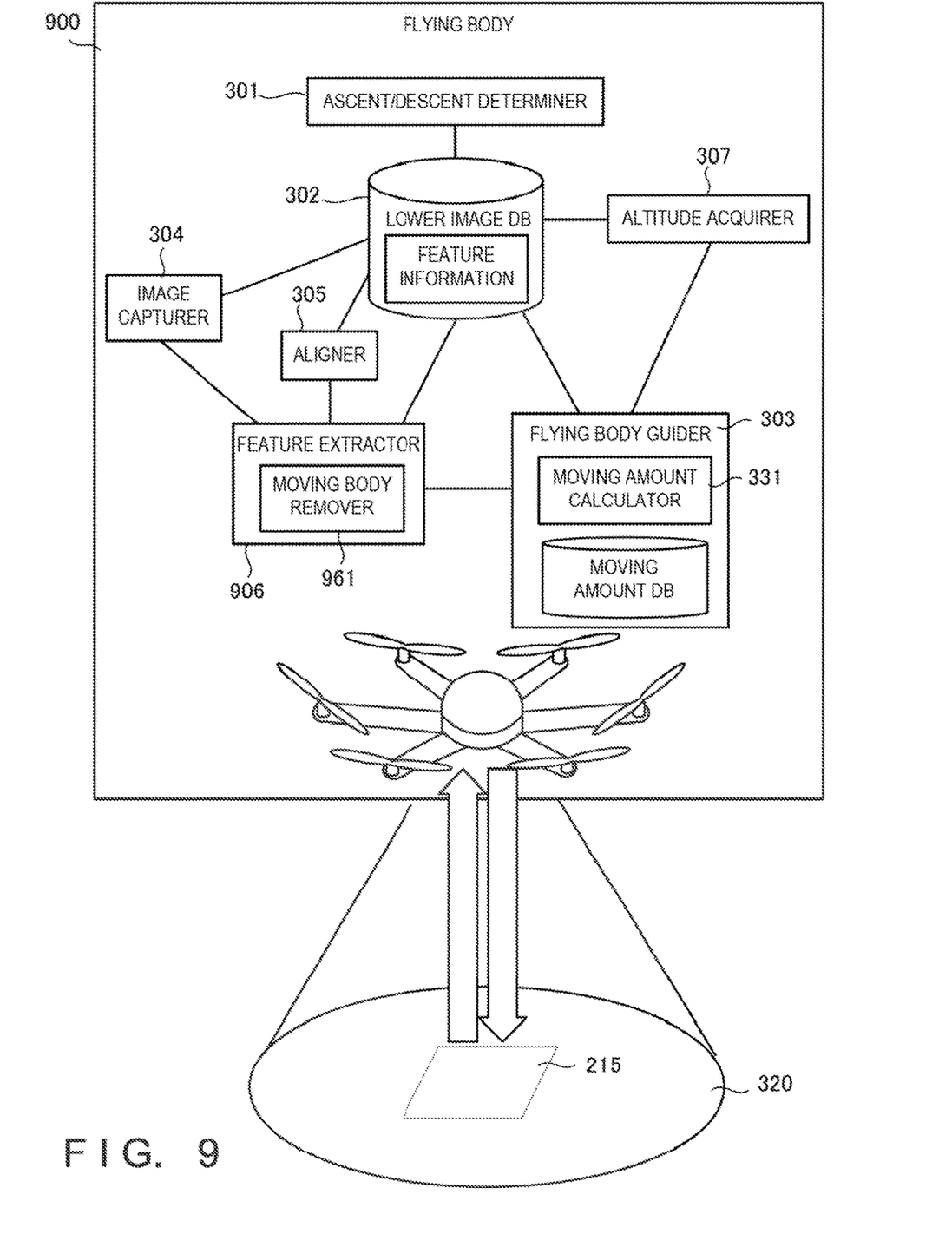
FIG. 9 is a view for explaining the arrangement of a flying body according to the third example embodiment of the present invention.

A flying body 900 according to the third example embodiment of the present invention will be described next with reference to FIG. 9. FIG. 9 is a view for explaining the internal arrangement of the flying body 900 according to this example embodiment. The flying body 900 according to this example embodiment is different from the above-described second example embodiment in that a feature extractor 906 includes a moving body remover 961. The rest of the components and operations is the same as in the second example embodiment. Hence, the same reference numerals denote similar components and operations, and a detailed description thereof will be omitted.

The moving body remover 961 compares a plurality of images (frames) captured and recorded in a ground image database 302 while ascending at the time of takeoff, and calculates the moving vectors of feature points between the frames. That is, if an object included in the plurality of ground images captured during takeoff/ascent of the flying body 900 does not move radially with respect to the takeoff point as the center along with the elapse of time in the images, the object is determined as a moving body and excluded from the extraction target of the feature point.

Figure 10:
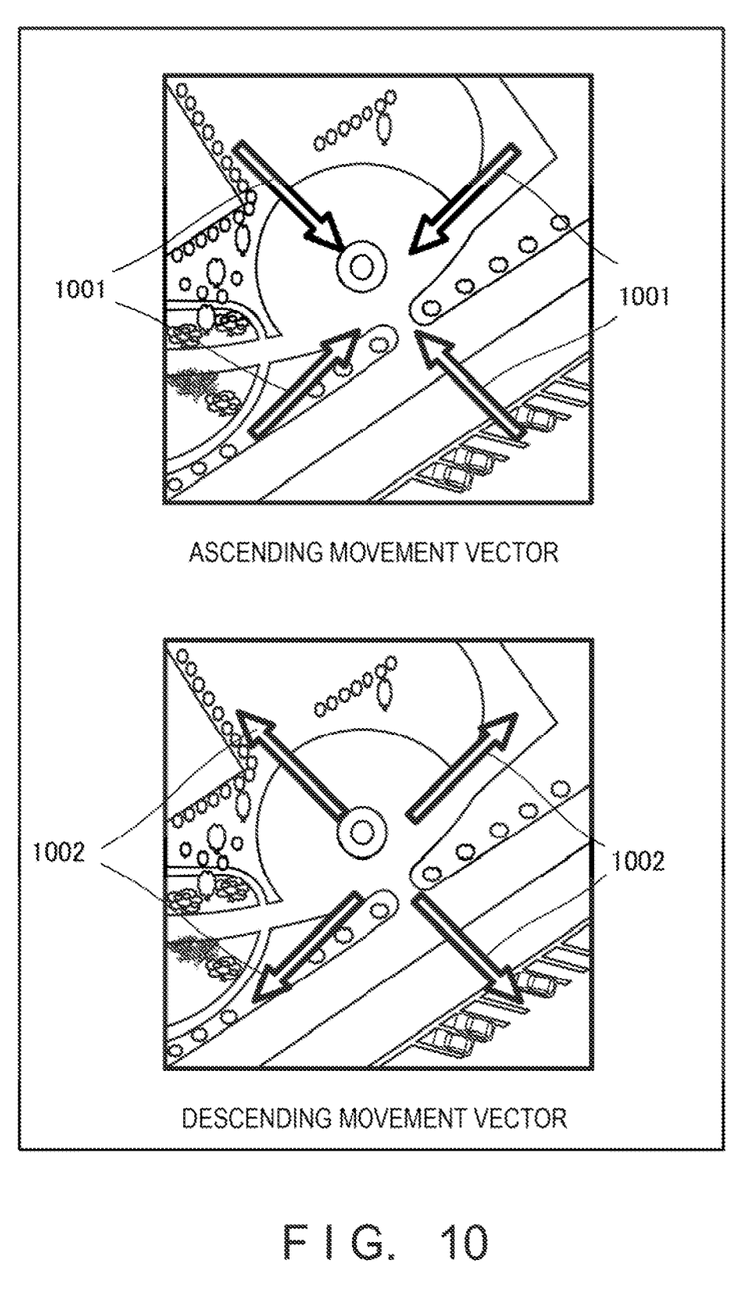
FIG. 10 is a view for explaining the arrangement of the flying body according to the third example embodiment of the present invention.

At the time of takeoff/ascent, feature points with vectors other than ascending movement vectors 1001 directed to the takeoff point, as shown in FIG. 10, are excluded from feature points to be recorded as a moving body such as a vehicle or a human, which is not fixed as the background.

On the other hand, at the time of landing/descent as well, feature points with vectors other than descending movement vectors 1002 directed radially outward from the takeoff point are excluded from feature points to be compared as a moving body such as a vehicle or a human, which is not fixed as the background.

Figure 11:
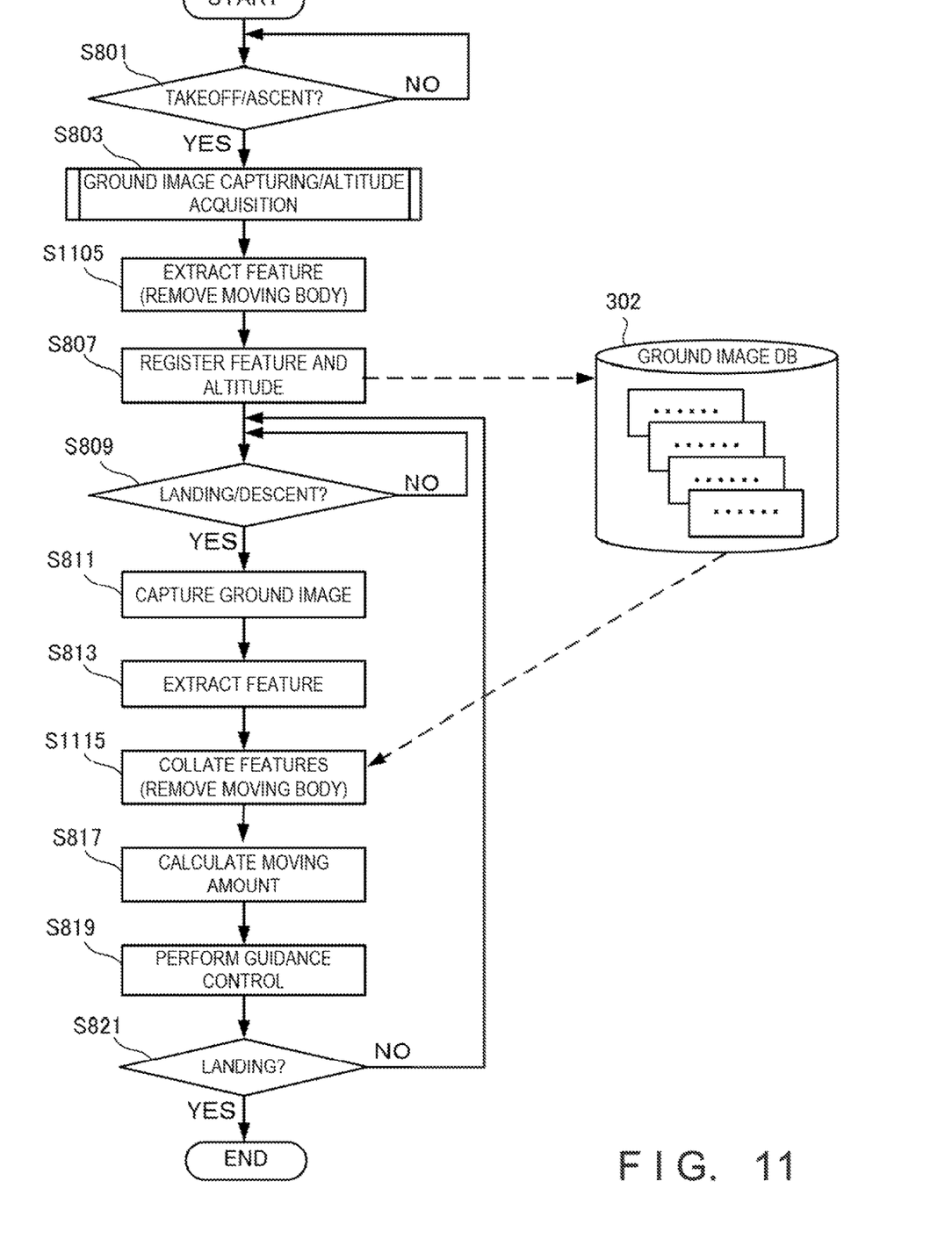
FIG. 11 is a flowchart for explaining the procedure of processing of the flying body according to the third example embodiment of the present invention.

FIG. 11 is a flowchart showing the procedure of processing performed in the flying body 900 according to this example embodiment. This flowchart is the same as the flowchart of FIG. 8 except that moving body removing processing (vector processing) is performed in steps S1105 and S1115, and a description thereof will be omitted.

As described above, according to this example embodiment, learning and matching can accurately be performed by removing a moving body, and the flying body can thus accurately be landed at a predetermined position.

Fourth Example Embodiment

A flying body according to the fourth example embodiment of the present invention will be described next. In the above-described example embodiments, matching between contents recorded at the time of takeoff/ascent and ground images captured during descent is performed. In this example embodiment, furthermore, guidance control is performed using preliminary image information recorded in a recorder in advance before takeoff. More specifically, at a predetermined altitude or more, matching and flying body guidance control are performed using feature points extracted from entire images. At an altitude less than the predetermined altitude, guidance is performed by performing pattern matching with a target marker (for example, a pattern registered in advance at 15 m) easy to see.

The altitude at which the matching method is switched may be decided from the angle of view of a camera and the size of the target marker, or may be decided from the number of feature points included in an image captured at the altitude.

Fifth Example Embodiment

Figure 12:
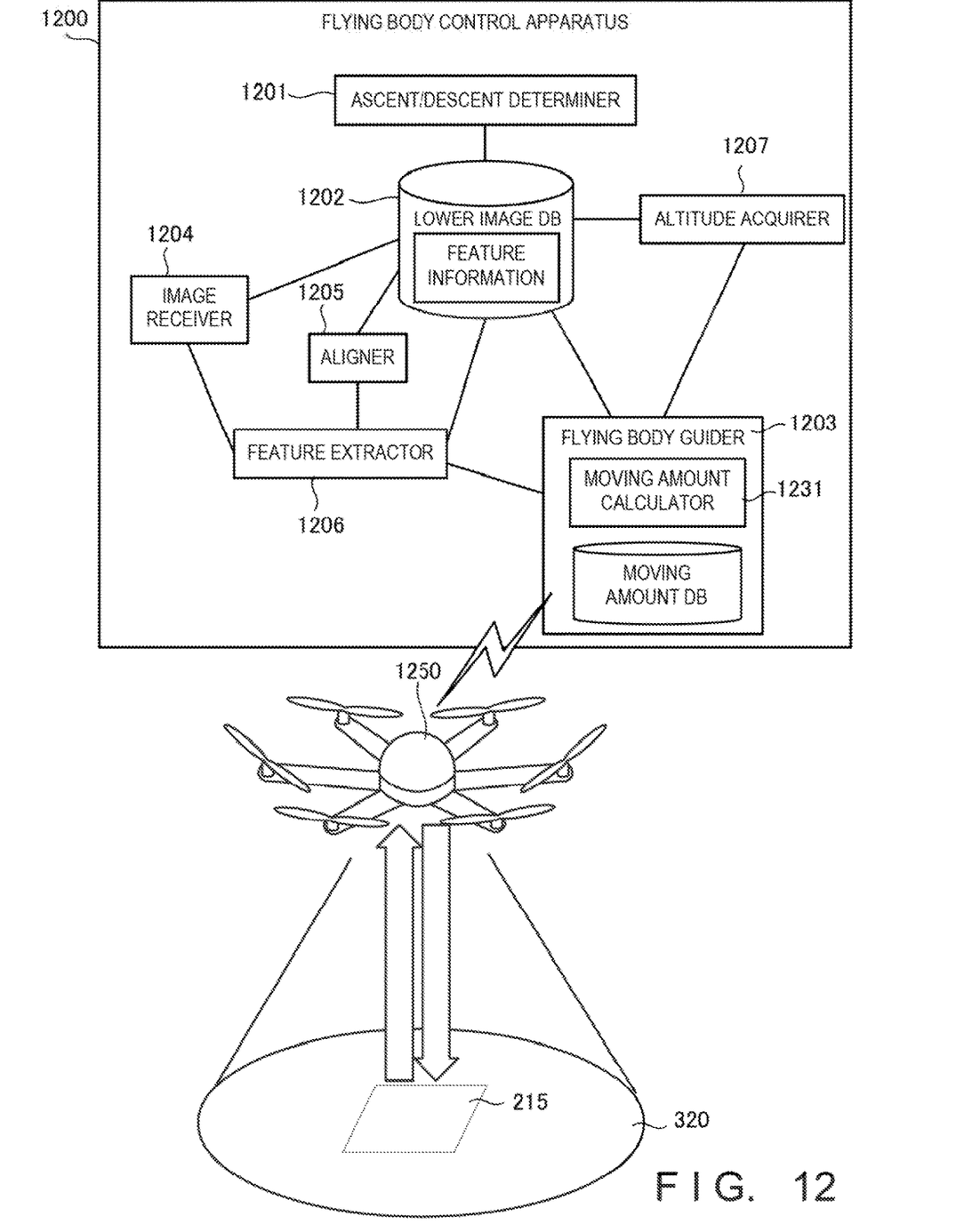
FIG. 12 is a view for explaining the arrangement of a flying body control apparatus according to the fifth example embodiment of the present invention.

A flying body control apparatus 1200 according to the fifth example embodiment of the present invention will be described next with reference to FIG. 12. FIG. 12 is a view for explaining the internal arrangement of the flying body control apparatus 1200 (so-called transmitter for radio-controlled toys) according to this example embodiment.

The flying body control apparatus 1200 according to this example embodiment includes an ascent/descent determiner 1201, a ground image database 1202, a flying body guider 1203, an image receiver 1204, an aligner 1205, a feature extractor 1206, and an altitude acquirer 1207.

The ascent/descent determiner 1201 determines whether a flying body 1250 is taking off and ascending from a takeoff point 315 or descending to land.

At the time of takeoff/ascent, the image receiver 1204 faces directly downward and captures/learns images. At the time of horizonal movement after that, the image receiver 1204 captures images in arbitrary directions and receives the images. At the time of landing, the flying body 1250 is returned to the neighborhood by a GPS. At the time of landing, the flying body descends while directing the camera of the flying body 1250 directly downward to capture images.

The aligner 1205 performs alignment of ground images to absorb the position deviation of the flying body 1250 during takeoff/ascent, and then records the images in the ground image database 1202. That is, the ground images are cut such that the takeoff point 315 is always located at the center.

The altitude acquirer 1207 acquires flight altitude information concerning the altitude at which the flying body 1250 is flying. The ground image database 1202 records the flight altitude information in association with a ground image. In addition, the ground image database 1202 records a plurality of ground images corresponding to different image capturing altitudes.

The feature extractor 1206 extracts a plurality of feature points from a ground image, and records the extracted feature points as learning information in the ground image database 1202.

The flying body guider 1203 compares feature points recorded in the ground image database 1202 with feature points extracted from ground images captured during descent. In accordance with flight altitude information, the flying body guider 1203 selects, from the ground image database 1202, contents for which matching with ground images captured during descent should be performed. The flying body guider 1203 performs matching for every predetermined altitude and performs guidance in a moving amount according to the altitude any time.

According to this example embodiment, the flying body can accurately be landed at a desired point.

Other Example Embodiments

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims. A system or apparatus including any combination of the individual features included in the respective example embodiments may be incorporated in the scope of the present invention.

The present invention is applicable to a system including a plurality of devices or a single apparatus. The present invention is also applicable even when an information processing program for implementing the functions of example embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described example embodiments.

The invention claimed is:

1. A flying body comprising:
   a determiner that determines whether the flying body is taking off and ascending from a takeoff point or descending to land;
   a generator that generates a geofence centered on the takeoff point;
   a camera mounted in the flying body;
   a recorder that records a lower image captured by the camera if it is determined that the flying body is taking off and ascending;
   an altitude acquirer that acquires flight altitude information; and
   a guider that, if it is determined that the flying body is returned to an area which is within a predetermined range from the takeoff point, guides the flying body to the takeoff point while descending using a lower image recorded in the recorder during takeoff/ascent and a lower image captured during the descent,
   wherein the guider controls the flying body to start descending at a point to hit the geofence,
   wherein the recorder records the lower image which is cut such that the takeoff point is located at the center,
   wherein the guider performs matching of the recorded takeoff point and the captured lower image for every predetermined altitude and guides the flying body according to the altitude, and
   wherein if the altitude acquirer cannot acquire the flight altitude information, the guider matches the recorded takeoff point and a lower image of an early acquisition timing instead of a lower image of a late acquisition timing.

2. The flying body according to claim 1, wherein the recorder records the flight altitude information in association with the lower image.

3. The flying body according to claim 2, wherein
   the recorder records a plurality of lower images corresponding to different image capturing altitudes, and
   in accordance with the flight altitude information, the guider selects, from the recorder, the lower image to be used together with the lower image captured during the descent.

4. The flying body according to claim 1, wherein if it is determined that the flying body is descending to land, the guider guides the flying body to the takeoff point using the lower image captured by the camera during the takeoff/ascent, preliminary image information recorded in the recorder in advance before takeoff, and the lower image captured during the descent.

5. The flying body according to claim 1, wherein if it is determined that the flying body is at a predetermined altitude or more, the guider guides the flying body to the takeoff point using the lower image captured by the camera during the takeoff/ascent and preliminary image information recorded in the recorder in advance before takeoff, and wherein if it is determined that the flying body is at an altitude less than the predetermined altitude, the guider guides the flying body to the takeoff point using a lower image recorded in the recorder during takeoff/ascent and a lower image captured during the descent.

6. The flying body according to claim 1, wherein the guider performs guidance in a moving amount according to an altitude using a lower image recorded in the recorder at every predetermined altitude and the lower image captured during the descent.

\* \* \* \* \*